(12) United States Patent
Okada (10) Patent No.: US 6,704,872 B1
(45) Date of Patent: Mar. 9, 2004

(54) PROCESSOR WITH A FUNCTION TO PREVENT ILLEGAL EXECUTION OF A PROGRAM, AN INSTRUCTION EXECUTED BY A PROCESSOR AND A METHOD OF PREVENTING ILLEGAL EXECUTION OF A PROGRAM

(75) Inventor: Takayuki Okada, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,955

(22) Filed: Apr. 28, 1999

(30) Foreign Application Priority Data

May 19, 1998 (JP) .......................................... 10-136724

(51) Int. Cl.[7] .............................................. G06F 11/30
(52) U.S. Cl. ...................... 713/194; 713/189; 713/190; 713/193
(58) Field of Search ................................ 713/189, 190, 713/191, 152, 193, 194; 705/57, 58

(56) References Cited

U.S. PATENT DOCUMENTS

| | | | | |
|---|---|---|---|---|
| 4,849,927 A | * | 7/1989 | Vos .......................... 235/382.5 |
| 4,959,860 A | * | 9/1990 | Watters et al. .............. 713/202 |
| 5,237,616 A | * | 8/1993 | Abraham et al. ........... 713/193 |
| 5,563,946 A | * | 10/1996 | Cooper et al. ................. 705/56 |
| 5,754,646 A | * | 5/1998 | Williams et al. .............. 705/55 |
| 5,978,482 A | * | 11/1999 | Dwork et al. ................. 705/51 |
| 6,044,157 A | * | 3/2000 | Uesaka et al. .............. 380/201 |
| 6,314,409 B2 | * | 11/2001 | Schneck et al. ............. 705/54 |

* cited by examiner

Primary Examiner—Justin T. Darrow
Assistant Examiner—Kambiz Zand
(74) Attorney, Agent, or Firm—Scully, Scott, Murphy & Presser; Richard M. Ludwin, Esq.

(57) ABSTRACT

The present invention provides an improved technology of preventing illegal use and execution of a software program provided to a computer system. More particularly, the present invention is directed to a Processor of a type in which a memory managing unit is installed therein to manage storing operation of code/data in main memory and includes, as one of instruction set, an execution permitting instruction to permit execution of a program code (application) in the main memory. The procedure of execution permitting instruction is defined by a microprogram and includes an authentication procedure for authenticating the right to use the program beside a procedure for setting predetermined data in the memory managing unit in this invention. Execution of the software program is permitted only when the authentication processing is completed successfully. Because the authentication operation is performed within the processor, it is almost impossible to monitor or detect it from the exterior. Also, by using a processor ID unique to the processor chip as identification information for use in the authentication processing, the right to use a specific software program can be limited to a single processor.

18 Claims, 7 Drawing Sheets

PROCESSOR WITH A FUNCTION TO PREVENT ILLEGAL EXECUTION OF A PROGRAM, AN INSTRUCTION EXECUTED BY A PROCESSOR AND A METHOD OF PREVENTING ILLEGAL EXECUTION OF A PROGRAM

BACKGROUND OF THE INVENTION

1. Technical Field

The present invention relates to a technology of preventing a software program provided to a computer system from being used or executed illegally and, in particular, to a processor which is provided with a function to prevent illegal execution of a program, an instruction executed by a processor to prevent illegal execution of a program and a method of preventing illegal execution of a program. More particularly, this invention relates to a processor which is provided with a function to prevent illegal execution of a program which can not be externally monitored or modified, an instruction executed by a processor and a method of preventing illegal execution of a program.

2. Prior Art

Along with recent technological revolution, computer systems have penetrated into enterprises and homes in addition to universities and institutes. A computer system includes a workstation and a personal computer (PC), etc., which are relatively less expensive and can be purchased by general users in addition to host/main frames and office computers. Especially, rapid popularization of a PC is remarkable.

Along such technological trend, various software programs running on computer systems have been developed and sold and the software industry are now as prosperous as or even more prosperous than the hardware industry. The software as referred to here includes an OS (operating system) for controlling the operation of an entire computer system and an application program for implementing functional operation suited an objective and an operation of users on a system. Programs of various functions and for various uses are available as an application program such as a word processing, spread sheet, database and communication programs, etc.

Users typically purchase a software which the users want to install on their own computer systems in the form of removable media such as a floppy disk and a CD-ROM and use the media by mounting them on a suitable drive unit. Also, it is recently possible to install a software program by a process of file transfer (download) of a desired software into the user's own local disk via an external network such as the internet.

However, purchasing media which store software programs is no more than obtaining a limited right to use the software programs and does not mean that the purchaser has obtained copyright of the software program or the right to reproduce it. Unlimited or unlicenced reproduction of a software program is an act which is strictly prohibited by the copyright law. (Incidentally, it would be reasonable to interpret that the use of a software downloaded via a network is also limited).

From the stand point of a software vendor who provides a software program, profit comes from distribution of program storing media with charge. If reproduction is rampant without limitation and permission, profit which should be rightfully enjoyed could not be assured. Illegal use of a software program discourages the volition of those who engage software industries to develop a software and may thus deactivate the activity of the software industries. In view of the above, a protection technology has been so far developed to prohibit a software program from being illegally used or reproduced without permission (or prevent beforehand).

An example of protection is to encrypt a software program for which it is desired to prevent illegal use. Specifically, by distributing program storing media in encrypted condition with charge or charge free and providing a key to decrypt the encryption only to a legitimate user, the use of the program which is stored in the media is suitably limited.

A problem involved here is by what media to provide a user with a key. For example, it may be possible for a software vendor to provide the user with a key by a mail such as an envelop but it would be very easy to use the key illegally in this case.

A further highly technological method includes the use of a so-called "security device". In this case, the software vendor distributes program storing media with a security device attached thereto. The security device contains identification information and the like required for a predetermined authentication procedure and is used by being connected to a serial port or a parallel port of User's PC, for example. On the other hand, the program stored in the media includes some number of check points (i.e., "authentication routine") in addition to a main routine for effecting an operation which is specific to the function and the use of the program per se.

An example of the authentication routine is such that a CPU (Central Processing Unit) executing a program gets an access to the security device to read out the identification information for verifying whether or not it matches identification information possessed by the program in each check point and permits the CPU to continue to run the program only when the identification information match each other.

In another example of an authentication routine, a CPU executing a program writes a code conforming to a certain rule into a security device. The security device prepares scrambled or encrypted identification information using the received code. The CPU reads out the scrambled or encrypted identification information and descrambles or decrypts it by a program to correlate it to the identification information possessed by the program. The CPU is permitted to continue to run the program only when the information is successfully correlated. While the CPU and the security device are connected via a bus external to the CPU chip, the authentication routine is prevented from being decoded by bus snooping by effecting scrambling or encryption.

These two examples using the security device are analogous each other in that authentication processing is effected by an instruction to the CPU executing a program.

By using the security device, the security level could be upgraded considerably. Also, the right to use a software program could be limited only to a single computer system in which the security device is mounted. However, this method could not be said to be perfect. For example, because a bus transaction can be easily monitored by using a logic analyzer (well known), it would be possible to analyze the authentication routine to reveal the identity of identification information and an encryption key.

For further improving the security level, a measure has been employed to successively change an input value to the security device. However, with a device like ICE (InCircuitEmulator)*, a software can be relatively easily reverse-assembled so that the program can be modified so as to unconditionally jump a routine accessing to the security device (i.e., authentication routine).

Accordingly, it is desirable to so design that a security operation is indispensable to the execution of a program in order to enhance the protection of a software program. In this sense, the above prior art examples in which a program per se stored in the media contains an authentication routine are adequate. Further, the authentication routine must be in a form which can not be externally accessed or modified. In the above prior art examples using the security device, although the authentication routine is implemented in the form of a system operation and is invisible in the appearance, it can be decoded technically (described in the above). In summary, a conventional protection method which is externally accessible can not be said to be perfect in protecting a program.

ICE is a device normally used for assisting to develop a program and a software and operates exactly similar to a CPU by inserting it in a CPU socket in place of a CPU. Contrary to a CPU, the ICE can access to a bus and read out a register value for each instruction. By using such instruction trace function of the ICE, the authentication routine can be located in the software program using the address of an external device as a trigger. Further, by applying an illegal patch to a program address, the program can be modified so as to have it continue to run without accessing the security device.

SUMMARY OF THE INVENTION

It is an object of this invention to provide an improved technology to prevent illegal use and execution of a software program provided to a computer system.

It is another object of this invention to provide an improved processor having a function to prevent illegal execution of a program, an instruction executed by a processor to prevent illegal execution of a program and a method of preventing illegal execution of a program.

It is a further object of this invention to provide an improved processor having a function to prevent illegal execution of a program which can not be externally monitored or modified, an instruction executed by a processor and a method of preventing illegal execution of a program.

This invention is conceived in view of the above objects and, in this first aspect, provides a processor having a function to prevent illegal execution of a program and of a type which has a memory managing unit having a function to manage a main memory installed therein and has an instruction set for operating itself, in which said instruction set includes an execution permitting instruction for permitting execution of a program code on said main memory, and said execution permitting instruction includes a predetermined authentication operation beside an operation to provide said memory managing unit with an identification number of a program to be executed and address/attribute information.

Said predetermined authentication operation may include comparison of the identification information stored within said processor with identification information supplied from exterior of said processor.

The identification information used for authentication may comprise a processor ID unique to said processor and a software ID unique to a software program.

Alternatively, the identification information may comprise a random number internally generated by said processor and the software ID unique to the software program.

The operation to provide said memory managing unit with the identification number of the program to be executed and the address/attribute information may be permitted when said predetermined authentication operation is successfully completed while it may be inhibited when the authentication operation fails.

This invention provides, in its second aspect, an instruction executed by a processor of a type which has a memory managing unit for managing a main memory installed therein, comprising; a predetermined authentication operation, and an operation to provide said memory managing unit with an identification number of a program to be executed and address/attribute information.

Said predetermined authentication may include comparison of identification information stored within said processor with identification information supplied from the exterior of said processor.

The identification information used for authentication may comprise a processor ID unique to said processor and a software ID unique to a software program.

Alternatively, the identification information may comprise a random number internally generated by said processor and the software ID unique to the software program.

The operation to provide said memory managing unit with the identification number of the program to be executed and the address/attribute information may be permitted when said predetermined authentication operation is successfully completed while it may be inhibited when the authentication operation fails.

This invention provides, in its third aspect, a processor having a function to prevent illegal execution of a program and of a type which executes predetermined processing while reading/writing a program code and data on a main memory, comprising; a bus interface for sending/receiving an instruction and data to and from the exterior of said processor, a decoder for decoding a received instruction, an internal memory for storing a procedure relating to one or more instructions, a logic circuit implementing the procedure relating to one or more instructions, a control unit for executing instructions according to the procedure stored in said internal memory and the procedure implemented in said logic circuit, a processor ID unique to said processor, and a memory managing unit having a function to manage said main memory, one of said internal memory and said logic circuit storing a procedure of execution permitting instruction which permits execution of a program code on said main memory and the procedure of said execution permitting instruction including a predetermined authentication operation beside an operation of providing said memory managing unit with identification information of a program and address/attribute information.

The processor of the third aspect having a function to prevent illegal execution further comprises; an encryption means for encrypting said processor ID to output it to the exterior via said bus interface, and a decryption means for receiving the encrypted identification information from the exterior via said bus interface and decrypting it to derive the processor ID and the software ID, and in which said predetermined authentication operation may include comparison of ID's each other.

The operation to provide said memory managing unit with the identification number of the program to be executed and the address/attribute information may be permitted when said predetermined authentication operation is successfully completed while it may be inhibited when the authentication operation fails.

This invention provides, in its fourth aspect, a processor having a function to prevent illegal execution of a program and of a type which executes predetermined processing while reading/writing a program code and data on a main memory, comprising; a bus interface for sending/receiving an instruction and data to and from the exterior of said processor, a decoder for decoding a received instruction, an internal memory for storing a procedure relating to one or more instructions, a logic circuit implementing the procedure relating to one or more instructions, a control unit for executing instructions according to the procedure stored in said internal memory and the procedure implemented in said logic circuit, random number generating unit, and a memory managing unit having a function to manage said main memory, one of said internal memory and said logic circuit storing a procedure of execution permitting instruction which permits execution of a program code on said main memory and the procedure of said execution permitting instruction including a predetermined authentication operation beside an operation of providing said memory managing unit with identification information of s program and address/attribute information.

The processor of the fourth aspect having a function to prevent illegal execution of a program further comprises random number output means for outputting a random number generate by said random number generating means via said bus interface, and decoding means for receiving encrypted identification information via said bus interface from the exterior and decrypting it to retrieve the random number and a software ID, and in which said predetermined authentication operation may include comparison of the random number with the software ID.

The operation to provide said memory managing unit with the identification number of the program to be executed and the address/attribute information may be permitted when said predetermined authentication operation is successfully completed while it may be inhibited when the authentication operation fails.

This invention provides, in its fifth aspect, a method of preventing illegal use of a program for a software supplier to permit the right to use a software program to only a single processor, comprising the steps of;

(a) receiving a software program to which a software ID is attached, (b) encrypting a processor ID unique to said processor to output it to the exterior of said processor, (c) decrypting the encrypted processor ID and encrypting a software ID managed by a software supplier together with said processor ID in the software supplier, (d) supplying the identification information encrypted in the step (c) to said processor, (e) decrypting the identification information to retrieve the processor ID and the software ID in said processor, (f) correlating the processor ID held by said processor and the software ID attached to said software program with the processor ID and the software ID obtained in the step (e), respectively, (g) permitting said processor to execute said software program only when said correlating process is completed successfully.

This invention provides, in its sixth aspect, a method of preventing illegal use of a program for a software supplier to permit the right to use a software program to only a single processor, comprising the steps of;

(a) receiving a software program to which a software ID is attached, (b) generating a random number by said processor to output it to the exterior of said processor, (c) encrypting a software ID managed by a software supplier together with said random number outputted by said processor ID in the software supplier, (d) supplying the identification information encrypted in the step (c) to said processor, (e) decrypting the identification information to retrieve the random number and the software ID in said processor, (f) correlating the random number held by said processor and the software ID attached to said software program with the random number and the software ID obtained in the step (e), respectively, (g) permitting said processor to execute said software program only when said correlating process is completed successfully.

The processor of this invention is of a type which has a memory managing unit installed therein for managing storing operation of code/data in the main memory and includes an execution permitting instruction to permit execution of a program code (application) in the main memory as one of the instruction set.

Such kind of execution permitting instruction includes a procedure to set an identification number of the program to be executed, a store address of the program and attribute information of the program in the memory managing unit (described in a code "LOAD MMU . . . " for example). The procedure of the instruction is defined by a microprogram.

In this invention, the execution permitting instruction includes an authentication procedure for authenticating the right to use the program beside the procedure to set predetermined data in the memory managing unit. The authentication operation is done, for example, by a comparison of identification information held within the processor with identification information supplied from the exterior (supplier of the software program, for example) of the processor. Execution of the software program is permitted only when the authentication operation is completed successfully.

The identification information used in the authentication procedure comprises a processor ID unique to the processor (assigned upon manufacturing, for example) and a software ID uniquely assigned to a software program. Alternatively, the identification information comprises a random number which the processor generates from time to time and a software ID uniquely assigned to the software program.

It is almost impossible to externally monitor or detect such authentication operation because it is executed within the processor. Also, because the authentication procedure is included in the microprogram describing an instruction which means permission to execute the program, the existence of the authentication procedure itself looks as if it is hidden from the exterior. Thus, prevention of illegal execution of a program can be largely enhanced in this invention.

By using a processor ID which the processor chip inherently possesses as identification information used for authentication process, the right to use a specific software program is limited to a single processor. In this sense, it can be said that illegal execution of a program is strictly inhibited.

Further objects, features and advantages of this invention will be apparent from embodiments of this invention and a detailed description based on the accompanying drawings.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
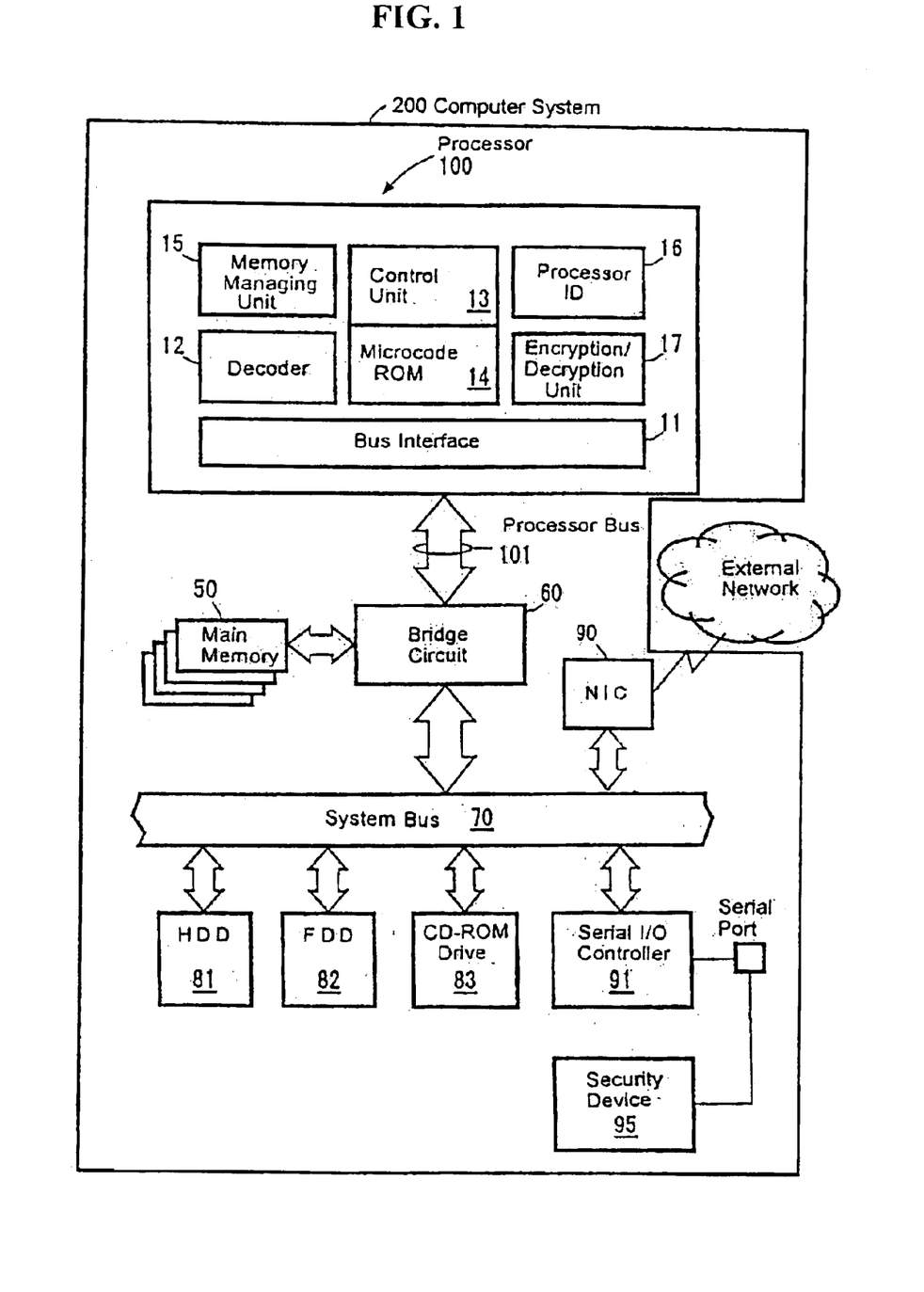
FIG. 1 schematically shows a hardware configuration of a computer system and a processor 100 of a first embodiment of this invention.

FIG. 1 schematically shows a hardware configuration of a computer system 200 and a processor 100. The computer system 200 comprises a main memory 50 and peripheral devices in addition to the processor 100 which effects a control of the core of the system 200. Each component is now described hereunder.

A processor bus 101 which is directly connected to external pins of the processor 100 is connected to a system bus 70 via a bridge circuit 60. The bridge circuit 60 contains a data buffer for absorbing the difference of operating speeds between the processor bus 101 and the system bus 70, and a memory controller for controlling access operation to the main memory 50.

The main memory 50 is a read/write memory for temporarily storing a program code and process data executed by the processor 100 and normally comprises one or more DRAM (dynamic RAM) chips. The memory space spread in the main memory 50 is managed by a memory managing unit 15 (to be described later).

A PCI (Peripheral Component Interconnect) bus and a ISA (Industry Standard Architecture) bus correspond to the system bus 70 to which various peripheral devices are interconnected. The peripheral devices include a console and the like such as a keyboard and a display (not shown), external storage devices such as a hard disk drive (HDD) 81, a floppy disk drive (FDD) 82 and a CD-ROM drive 83, a network interface card (NIC) 90 for connecting to an external network, and a serial I/O controller 91 for effecting input/output of serial data via a serial port. The operation on the bus 70 can be analyzed using a logic analyzer and the like.

A software supplier normally distributes a software program in the form of a storage media such as a floppy disk and a CD-ROM to general users. A user mount such storage media on a predetermined drive unit and copies to the HDD 81 to install the software program in the system 200, i.e., to make it operable. Recently, a software program is often distributed via an external network such as the internet.

The processor 100 is one which is called a CPU (Central Processing Unit) or a MPU (Micro Processing Unit) in the industry. The processor 100 is a circuit chip normally mounted on a mother board (not shown) and performs an essential function of the computer system 200 including control of input/output devices (not shown) for sending/receiving data and arithmetic processing of data to store the result of processing in the main memory 50.

As shown in FIG. 1, the processor 100 of this embodiment comprises a bus interface 11, a decoder 12, a control unit 13, a microcode ROM 14, a memory managing unit 15, a processor ID 16, and an encryption/decryption unit 17.

A bus interface 11 is a unit for sending/receiving instructions and data among the components external to the processor 100. The bus interface 11 is directly connected to the processor bus 101. The processor bus 101 is interconnected to the main memory 50 and the system bus 70 via the bridge circuit 60.

The decoder 12 is a unit for interpreting instructions received via the bus interface 11 to covert it to a form which the control unit 13 can understand.

The control unit 13 is a unit for ordering the sequence of execution of instructions. Instructions executed are classified into a type which is executed by a wired logic (wiring logic) and a type which is executed by a microprogram. In the former type, a sequencing circuit which linearly implements a logic required for controlling execution of instructions is used. In the latter type, an instruction comprises a set of finer codes called microcodes (or pico-codes), i.e., a microprogram, which is executed by being read out from a microcode ROM 14. Instructions available for a single processor are collectively called an "instruction set".

The microcode ROM 14 is a read only memory storing microcodes required for executing instructions. In other words, the microcode ROM is a non volatile memory defining the sequence of execution of each instruction. For example, instructions "LOAD", "STORE", "MOVE", etc., which are instructions for writing a variable into a register (not shown) in the processor 100 can be defined by describing the detail of operations thereof in the microcode ROM 14.

The memory managing unit (MMU) 15 is a unit for managing the memory space of the processor 100 including mapping program codes and data in the main memory 50. The memory managing unit 15 normally provides 2 functions including a virtual memory function and a memory protection function. The virtual memory function is a function to convert a logical address to a physical address and replace (swap) blocks (pages) between the main memory and a external storage device when a block (page) corresponding to a physical address does not exist in the main memory. The memory protection function is a function to keep a failure occurring in one program from affecting another program.

Figure 2:
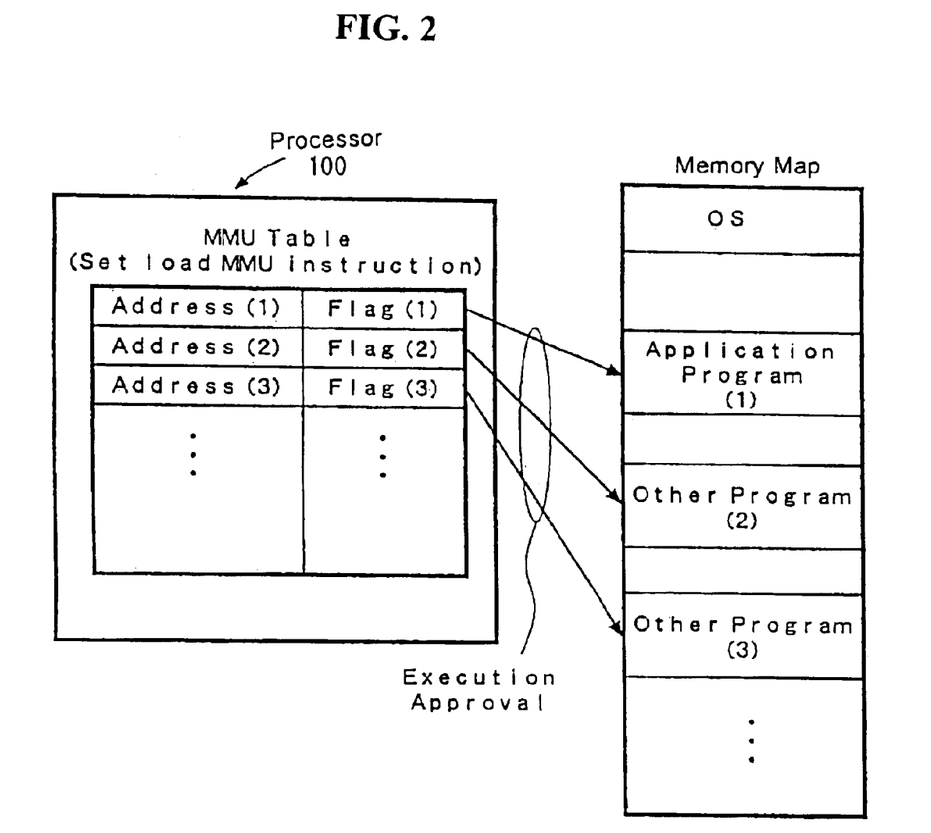
FIG. 2 schematically shows the structure and the function of the MMU table.

The memory managing unit 15 is provided with a MMU table for managing address and attribute information of programs existing in the memory space. FIG. 2 schematically shows the structure and the function of the MMU table. Each entry of the MMU table contains a field for storing an address and a flag of the corresponding program. The flag indicates attribute information (whether the program is of an executing form, read only, or readable and writeable, for example) of a program.

Each program in the memory space has a program ID unique to it. In order to have the processor 100 execute a program, the control unit 13 is supplied with a program code to provide the memory managing unit 15 with a program ID and address and attribute information thereof. The memory managing unit 15 is so configured as to refer to its own MMU table to permit execution of the corresponding program. The following expression is a description of pseudo codes for permitting execution of a program.

Mov R1, Program_ID
  (Set a program ID in register R1)
Mov R2, Memory_Address_&Flag
  (Set an address and a flag in register R2)
Load MMU, R1, R2
  (Set the contents of registers R1 and R2 in the memory managing unit)
Jmp Application
  (Jump to application) "Mov" and "Load" in the above codes are instructions to the processor 100 and mean setting a variable in registers and the like. A detailed sequence of each instruction is defined in the form of a wired logic or in the form of a microprogram defined in the microcode ROM 14 as described in the above.

Among the above pseudo codes, the step "Load MMU . . . " is essentially an instruction to permit execution of an application. In this embodiment, the instruction "Load MMU . . . " is implemented in the form of a microprogram and includes a predetermined authentication procedure beside setting variables in the memory managing unit 15.

Because the authentication procedure is described in the microprogram, the existence itself of the authentication procedure is invisible from the exterior of the processor 100. Because the authentication procedure is executed conclusively within the processor chip 100, it is almost impossible to monitor the operation externally. Therefore, the processor 100 can execute the authentication procedure invisibly from an external program which issued the instruction "Load MMU . . . ". The detail of the authentication procedure will be described later.

The processor ID is identification information (normally consisting of a serial number) unique to the processor 100 and uniquely assigned upon manufacturing, for example. The substance of the processor ID is numerical or character data written in a non volatile memory (not shown) and read out by the control unit 13 as appropriate.

The encryption/decryption unit 17 is an arithmetic unit for encrypting predetermined data and, conversely, decrypting the encrypted data. For example, highly secret data like the processor ID is outputted to the exterior of the processor via the bus interface 11 after it is encrypted by the encryption/decryption unit 17. Conversely, it also decrypts encrypted data (Key delivered from a software supplier, for example).

The encryption and decryption schemes may employ either of a secret key and a public key. In the latter public key scheme, a set of encryption keys comprising a public key and a private key are used and, when one of the keys is used in encryption, only the other of the keys allows decryption. For example, because data which a third party encrypted by a public key can be decrypted by that very party who has a private key, secret information can be exchanged safely as is well known.

In order to configure the processor 100, many units are required beyond those shown in FIG. 1. Examples of units omitted from FIG. 1 include an ALU (Arithmetic and Logic Unit) for performing an arithmetic operation between integers and a logic operation (AND,OR,NOT), an FPU (Floating-Point Unit) for performing an arithmetic operation of true number (Floating point and the like), a wired logic circuit (PLA; Programmable Logic Array) linearly implementing the sequence of execution of instructions, and input/output registers. However, they are omitted in this specification because they are well known in the art and do not constitute the gist of this invention. Similarly, it should be understood that only a part of connections among hardware blocks is shown in the drawing to avoid congestion of the drawing.

The program protection operation by the processor 100 is now described with reference to FIG. 3.

A software supplier distributes in the market a software program to be protected in the form stored in storage media such as a floppy disk or a CD-ROM. The software program is attached with unique identification information, i.e., a software ID (normally consisting of a serial number). A user acquires a limited right to use the software program in a form he or she purchases storage media such as a floppy disk or a CD-ROM from a supplier (it should be fully noted that purchasing storage media does never mean acquisition of a copyright or unlimited right to use of the software). The user then mounts the storage media on a predetermined drive unit 81/82 to install the software program in the hard disk 81 of the system 200.

The installing job includes a procedure to encrypt the processor ID 16 by a secret key (step S100) and a procedure to send the encrypted processor ID to the software supplier (step S102). The encryption process is done by using the encryption/decryption unit 17. The sending procedure means a request for a Key (described later) to the software supplier. The sending procedure may be effected by a mail or in the form of transmission via an external network connected by the NIC 90.

The software supplier decrypts the received encryption information to obtain the original processor ID (step S104). A Key is then generated by encrypting the processor ID and a software ID which the supplier manages by itself in its site integrally by a secret key (step S106). The Key is one which simultaneously encrypted the processor ID and the software ID as one code and can not be split into separate ID's. The Key has a nature to resolve the state of use inhibited of a software and is returned to the user by a mail or via the network (step S108).

It is assumed that execution of the software program is prompted on the computer system 200 in a condition where the Key is obtained. This is implemented by issuing an execution permitting instruction like "Load MMU . . . " by an external program such as an OS (operating system) to set the program ID and address/attribute information of the program in the memory managing unit 15.

Figure 3:
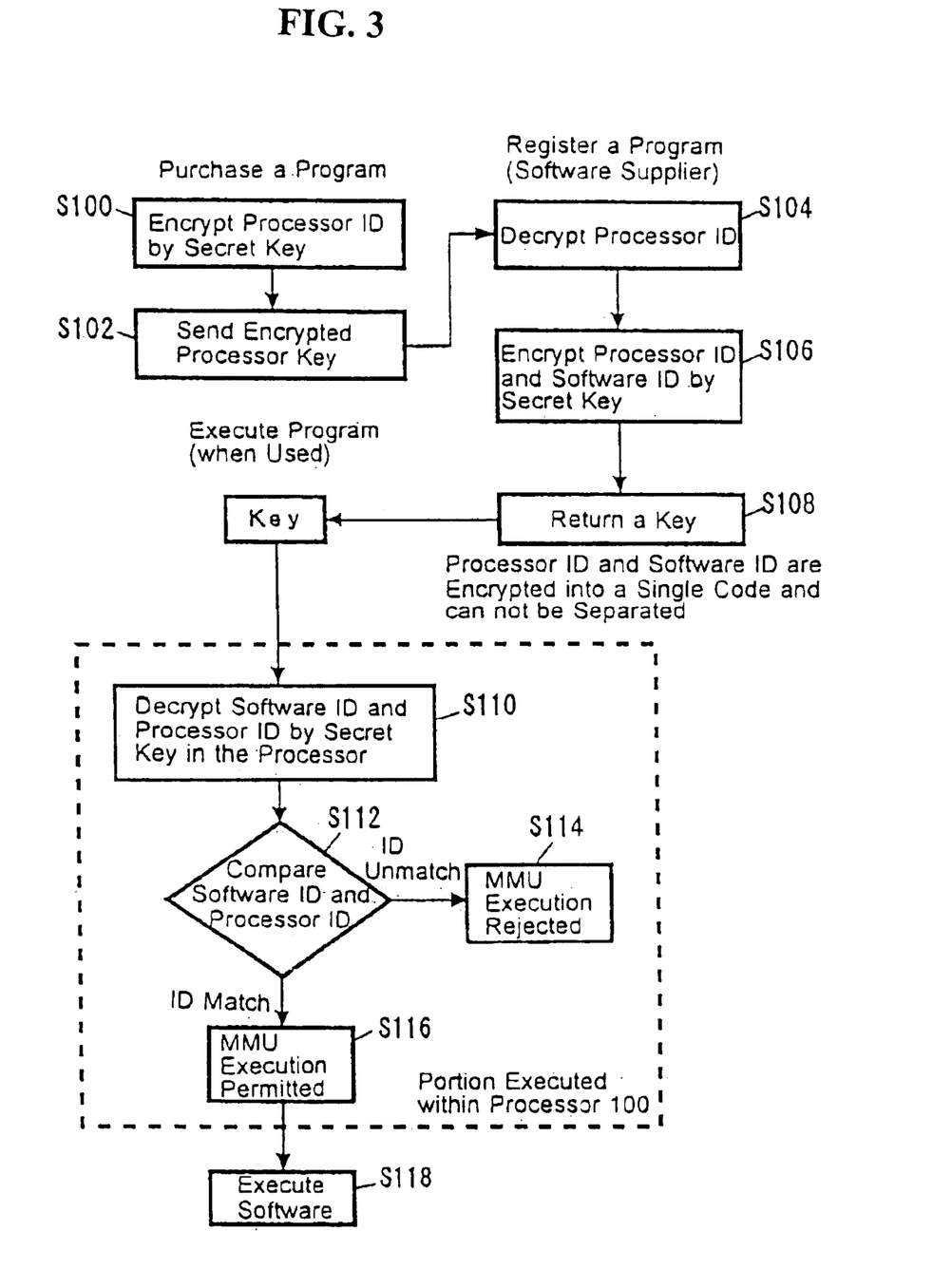
FIG. 3 is a flow chart showing a program protection operation of the first embodiment of this invention.

The processing procedure corresponding to the execution permitting instruction of this embodiment is surrounded by the block of dotted line in FIG. 3. The execution permission includes a predetermined authentication procedure beside setting variables in the memory managing unit 15.

When the instruction is issued, the processor 100 decrypts the received Key first of all to obtain the processor ID and the software ID (step S110). The decryption process is effected by using the encryption/decryption unit 17.

The processor 100 then compares the processor ID and the software ID obtained from decryption respectively with the processor ID stored in the processor itself and the software ID obtained from the mounted storage media (step S112).

If the correlation fails as a result of the comparison, execution of the program by the memory managing unit 15 is rejected (step S114). On the other hand, if the correlation is completed successfully, execution of the program by the memory managing unit 15 is affirmed (step S116) and the program is executed (step S118).

The procedure of such execution permitting instruction may be implemented by describing the processing procedure of instruction as described in the above in the microcode ROM 14, for example.

Steps S110 to S116 are executed by a single instruction "Load MMU . . . ". Pseudo microprogram codes describing the instruction are given below.

mtspr IBATO, Rs1, Rs2
  (Set address and flag of the program in Rs1 and key obtained from the software supplier in Rs2, respectively)
ld temp_reg1, Rs2
  (Obtain key)
decrypt temp-reg1
  (Compose by the secret key stored in the processor 100)
cmp temp_reg1, temp_reg3
  (Compare ID's each other)
jne unmatched
id temp_reg1, Rs
  (Set address and flag of the program in Rs)
st IBATO, temp_reg1
set flag_good
end_of_instruction
unmatched;
set flag_bad
end_of_instruction The authentication procedure according to such microprogram is executed totally invisibly from the external program. Because the authentication procedure of this embodiment is concluded within the processor chip, it is almost impossible to monitor from the exterior of the processor 100.

Figure 4:
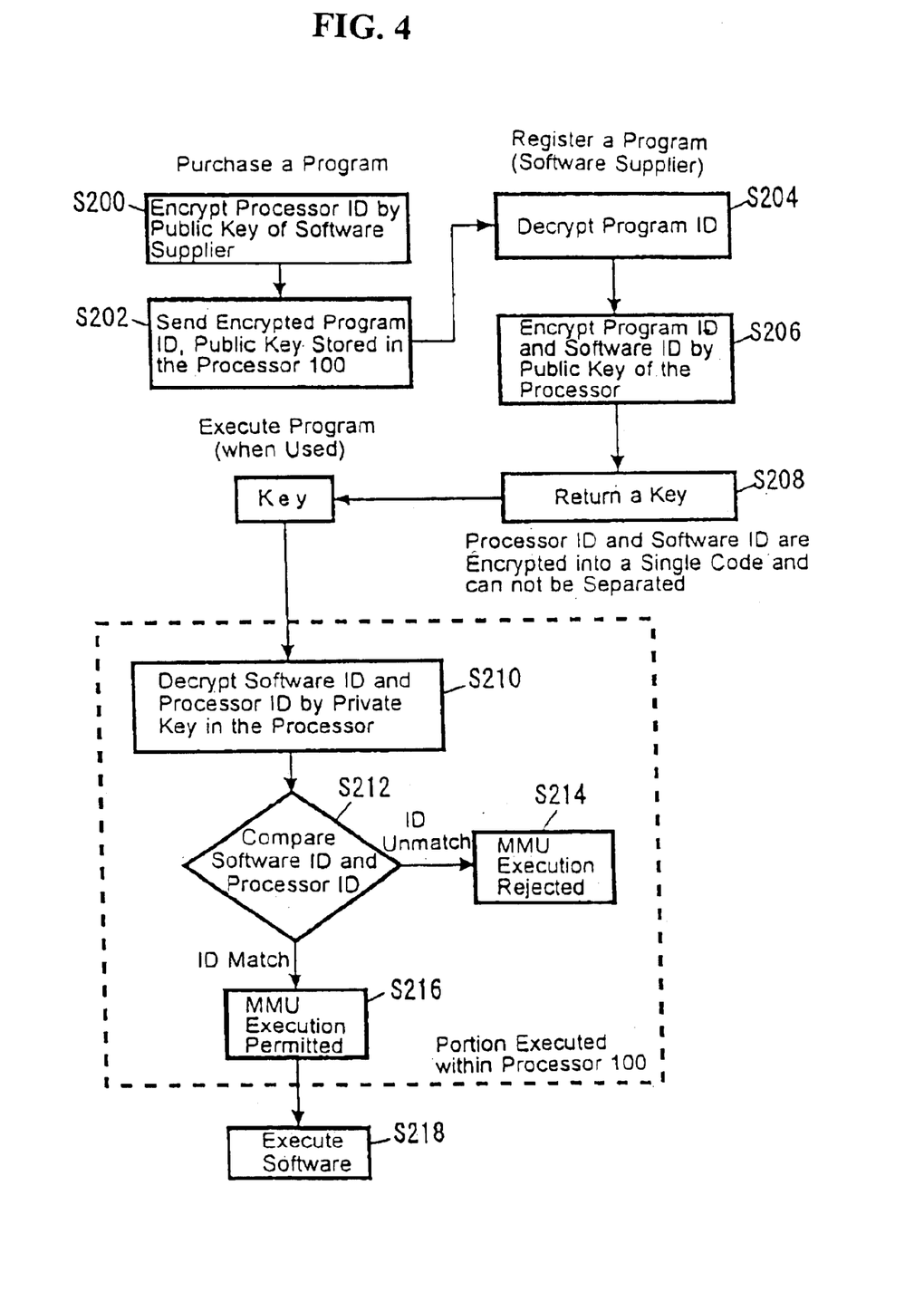
FIG. 4 is a flow chart showing a program protection operation of a second embodiment of this invention.

The second embodiment of this invention is implemented by a configuration equivalent to that shown in FIG. 1. However, a difference from the first embodiment lies in that the encryption is performed by a public key scheme rather than the secret key. FIG. 4 shows a program protection operation of the second embodiment in a flow chart. This is explained hereunder with reference to FIG. 4.

A software supplier distributes in the market a software program to be protected in the form stored in storage media such as a floppy disk or a CD-ROM. The software program is attached with unique identification information, i.e., a software ID (normally consisting of a serial number). A user acquires a limited right to use the software program in a form he or she purchases storage media such as a floppy disk or a CD-ROM from a supplier (it should be fully noted that purchasing storage media does never mean acquisition of a copyright or unlimited right to use of the software). The user then mounts the storage media on a predetermined drive unit 81/82 to install the software program in the hard disk 81 of the system 200.

The installing job includes a procedure to encrypt the processor ID 16 (step S200) and a procedure to send the encrypted processor ID and a public key stored in the processor 100 to the software supplier (step S202). The encryption process is done by the encryption/decryption unit 17 using a public key provided by the software supplier. The sending procedure means a request for a Key (described later) to the software supplier. The sending procedure may be effected by a mail or in the form of transmission via an external network connected by the NIC 90.

The software supplier decrypts the received encryption information using its own private key to obtain the original processor ID (step S204). A Key is then generated by encrypting the processor ID and a software ID which the supplier manages by itself in its site integrally again by the public key of the processor 100 (step S206). The Key is one which simultaneously encrypted the processor ID and the software ID as one code and can not be split into separate ID's. The Key has a nature to resolve the state of use inhibited of a software and is returned to the user by a mail or via the network (step S208).

It is assumed that execution of the software program is prompted on the computer system 200 in a condition where the Key is obtained. This is implemented by issuing an execution permitting instruction like "Load MMU . . . " by an external program such as an OS (operating system) to set the program ID and address/attribute information of the program in the memory managing unit 15.

The processing procedure corresponding to the execution permitting instruction of this embodiment is surrounded by the block of dotted line in FIG. 4. The execution permission includes a predetermined authentication procedure beside setting variables in the memory managing unit 15.

When the instruction is issued, the processor 100 decrypts the received Key first of all to obtain the processor ID and the software ID (step S210). The decryption process is effected by the encryption/decryption unit 17 using the private key stored in the processor 100 itself.

The processor 100 then compares the processor ID and the software ID obtained from decryption respectively with the processor ID stored in the processor itself and the software ID obtained from the mounted storage media (step S212).

If the correlation fails as a result of the comparison, execution of the program by the memory managing unit 15 is rejected (step S214). On the other hand, if the correlation is completed successfully, execution of the program by the memory managing unit 15 is affirmed (step S216) and the program is executed (step S218).

The procedure of such execution permitting instruction may be implemented by describing the processing procedure of instruction as described in the above in the microcode ROM 14, for example.

Steps S210 to S216 are executed by a single instruction "Load MMU . . . ". Pseudo microprogram codes describing the instruction are given below.

mtspr IBATO, Rs1, Rs2
  (Set address and flag of the program in Rs1 and key obtained from the software supplier in Rs2, respectively)
ld temp_reg1
  (Obtain key)
decrypt temp_reg1
  (Compose by the private key stored in the processor 100)
cmp temp_reg1, temp_reg3
  (Compare ID's each other)
jne unmatched
ld temp_reg1, Rs
  (Set address and flag of the program in Rs2,
st IBATO, temp_reg1
set flag_good
end_of_instruction
unmatched;
set flag_bad
end_of_instruction The authentication procedure according to such microprogram is executed totally invisibly from the external program. Because the authentication procedure of this embodiment is concluded within the processor chip, it is almost impossible to monitor from the exterior of the processor 100.

Figure 5:
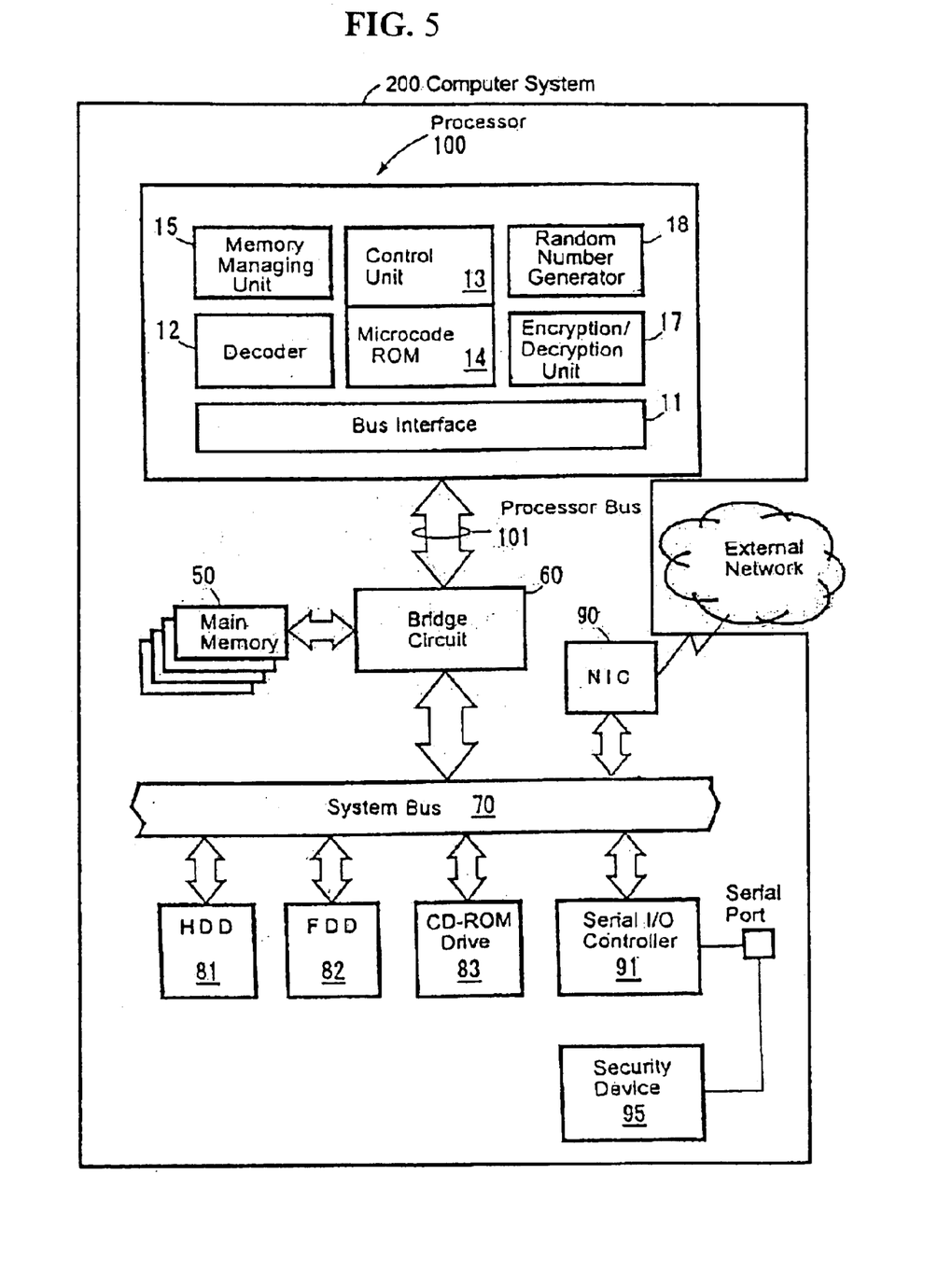
FIG. 5 schematically shows a hardware configuration of a computer system and a processor 100 of a third embodiment of this invention.

The third embodiment of this invention is different from the above described first and the second embodiments in that it uses a random number generated from time to time rather than the processor ID possessed by the processor 100 and performs a program protection by a cooperative operation with a security device 95.

FIG. 5 schematically shows a hardware configuration of a computer system 200 and a processor 100. Each component is now described hereunder A processor bus 101 which is directly connected to external pins of the processor 100 is connected to a system bus 70 via a bridge circuit 60. The bridge circuit 60 contains a data buffer for absorbing the difference of operating speeds between the processor bus 101 and the system bus 70, and a memory controller for controlling access operation to the main memory 50.

The main memory 50 is a read/write memory for temporarily storing a program code and process data executed by the processor 100 and normally comprises one or more DRAM (dynamic RAM) chips. The memory space spread in the main memory 50 is managed by a memory managing unit 15 (to be described later).

A PCI (Peripheral Component Interconnect) bus and a ISA (Industry Standard Architecture) bus correspond to the system bus 70 to which various peripheral devices are interconnected. The peripheral devices include a console and the like such as a keyboard and a display (not shown), external storage devices such as a hard disk drive (HDD) 81, a floppy disk drive (FDD) 82 and a CD-ROM drive 83, a network interface card (NIC) 90 for connecting to an external network, and a serial I/O controller 91 for effecting input/output of serial data via a serial port. The operation on the bus 70 can be analyzed using a logic analyzer and the like.

In this embodiment, the security device 95 is externally connected to the serial port. The security device 95 is concomitant in nature with a software program to be protected and includes an encryption unit according to either the secret key scheme or the public key scheme beside storing a software ID. The operation of the security device 95 will be described later.

A software supplier normally distributes a software program in the form of a storage media such as a floppy disk and a CD-ROM. A user mount such storage media on a predetermined drive unit and copies to the HDD 81 to install the software program in the system 200, i.e., to make it operable. Recently, a software program is often distributed via an external network such as the internet.

The processor 100 is one which is called a CPU (Central Processing Unit) or a MPU (Micro Processing Unit) in the industry. The processor 100 is a circuit chip normally mounted on a mother board (not shown) and performs an essential function of the computer system 200 including control of input/output devices (not shown) for sending/receiving data and arithmetic processing of data to store the result of processing in the main memory 50.

As shown in FIG. 5, the processor 100 of this embodiment comprises a bus interface 11, a decoder 12, a control unit 13, a microcode ROM 14, a memory managing unit 15, an encryption/decryption unit 17 and a random number generating unit 18.

A bus interface 11 is a unit for sending/receiving instructions and data among the components external to the processor 100. The bus interface 11 is directly connected to the processor bus 101. The processor bus 101 is interconnected to the main memory 50 and the system bus 70 via the bridge circuit 60.

The decoder 12 is a unit for interpreting instructions received via the bus interface to covert it to a form which the control unit 13 can understand.

The control unit 13 is a unit for ordering the sequence of execution of instructions. Instructions executed are classified into a type which is executed by a wired logic (wiring logic) and a type which is executed by a microprogram. In the former type, a sequencing circuit which linearly implements a logic required for controlling execution of instructions is used. In the latter type, an instruction comprises a set of finer codes called microcodes (or pico-codes), i.e., a microprogram, which is executed by being read out from a microcode ROM 14. Instructions available for a single processor are collectively called an "instruction set".

The microcode ROM 14 is a read only memory storing microcodes required for executing instructions. In other words, the microcode ROM is a non volatile memory defining the sequence of execution of each instruction. For example, instructions "LOAD", "STORE", "MOVE", etc., which are instructions for writing a variable into a register (not shown) in the processor 100 can be defined by describing the detail of operations thereof in the microcode ROM 14.

The memory managing unit (MMU) 15 is a unit for managing the memory space of the processor 100 including mapping program codes and data in the main memory 50. The memory managing unit 15 normally provides 2 functions including a virtual memory function and a memory protection function. The virtual memory function is a function to convert a logical address to a physical address and replace (swap) blocks (pages) between the main memory and a external storage device when a block (page) corresponding to a physical address does not exist in the main memory. The memory protection function is a function to keep a failure occurring in one program from affecting another program.

The memory managing unit 15 is provided with a MMU table for managing address and attribute information of programs existing in the memory space. Because the structure and the function of the MMU table are same as the above description referring to FIG. 2, they are not described here.

In order to have the processor 100 execute a program, the control unit 13 is supplied with a program code to provide the memory managing unit 15 with a program ID and address and attribute information thereof. Typically, execution of an application is substantially permitted by an instruction "Load MMU . . . ".

In this embodiment, the instruction "Load MMU . . . " is implemented in the form of a microprogram and includes a predetermined authentication procedure beside setting variables in the memory managing unit 15. Because the authentication procedure is described in the microprogram, the existence itself of the authentication procedure is invisible from the exterior of the processor 100. Because the authentication procedure is executed conclusively within the processor chip 100, it is almost impossible to monitor the operation externally. Therefore, the processor 100 can execute the authentication procedure invisibly from an external program which issued the instruction "Load MMU . . . ". The detail of the authentication procedure will be described later.

The encryption/decryption unit 17 is an arithmetic unit for encrypting predetermined data and, conversely, decrypting the encrypted data. For example, secret data like a random number which the processor 100 outputs to the exterior is outputted to the exterior of the processor via the bus interface 11 after it is encrypted by the encryption/decryption unit 17. Conversely, it also decrypts encrypted data (Key delivered from a software supplier, for example).

The encryption and decryption schemes may employ either of a secret key and a public key. In the latter public key scheme, a set of encryption keys comprising a public key and a private key are used and, when one of the keys is used in encryption, only the other of the keys allows decryption. For example, because data which a third party encrypted by a public key can be decrypted by that very party who has a private key, secret information can be exchanged safely as is well known.

The random number generating unit 18 is a unit for generating random numbers from time to time and is used in place of the processor ID in this embodiment. Random numbers are used because a fixed value would be likely to be revealed by monitoring operations in a plurality of authentication procedures repeatedly.

In order to configure the processor 100, many units are required beyond those shown in FIG. 5. Examples of units omitted from FIG. 5 include an ALU (Arithmetic and Logic Unit) for performing an arithmetic operation between integers and a logic operation (AND,OR,NOT), an FPU (Floating-Point Unit) for performing an arithmetic operation of true number (Floating point and the like), a wired logic circuit (PLA; Programmable Logic Array) linearly implementing the sequence of execution of instructions, and input/output registers. However, they are omitted in this specification because they are well known in the art and do not constitute the gist of this invention. Similarly, it should be understood that only a part of connections among hardware blocks is shown in the drawing to avoid congestion of the drawing.

The program protection operation by the processor 100 is now described with reference to FIG. 6.

A software supplier distributes in the market a software program to be protected in the form stored in storage media such as a floppy disk or a CD-ROM. The software program is attached with unique identification information, i.e., a software ID (normally consisting of a serial number). A user acquires a limited right to use the software program in a form he or she purchases storage media such as a floppy disk or a CD-ROM from a supplier (it should be fully noted that purchasing storage media does never mean acquisition of a copyright or unlimited right to use of the software).

This embodiment is different from the first and the second embodiments in that the security device 95 is distributed along with storage media storing a software program. The user installs the software program in the hard disk 81 and, at the same time, externally connects the security device 95 to the serial port (step S300). In this embodiment, a request for the Key is directed to the security device 95 rather than the software supplier as described later.

It is assumed that execution of the software program is prompted on the computer system 200. This is implemented by issuing an execution permitting instruction like "Load MMU . . . " by an external program such as an OS (operating system) to set the program ID and address/attribute information of the program in the memory managing unit 15.

Figure 6:
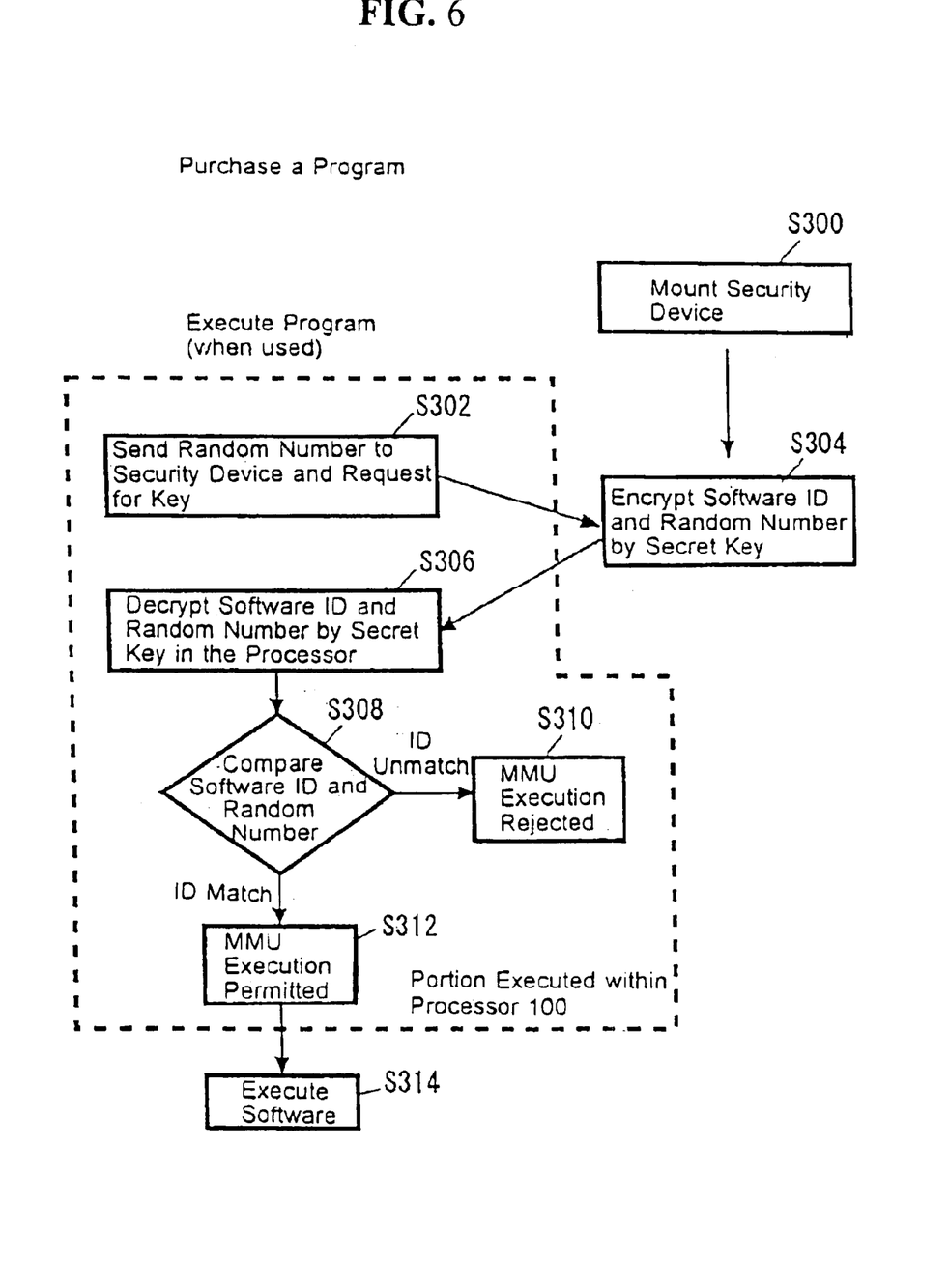
FIG. 6 is a flow chart showing a program protection operation of a fourth embodiment of this invention.

The processing procedure corresponding to the execution permitting instruction of this embodiment is surrounded by the block of dotted line in FIG. 6. The execution permission includes a predetermined authentication procedure beside setting variables in the memory managing unit 15.

When the instruction is issued, the processor 100 requests for the Key by sending a random number generated by the random number generating unit 18 to the security device 95 (step S302). The random number is sent via the system bus 70. However, because the random numbers change, in nature, from time to time and a same random number is used only once, it is very unlikely that the operation of the bus 70 is snooped and the security is broken.

The security device 95 encrypts the received random number and a software ID which the security device 95 itself stores integrally using a secret key to generate the Key and sends it back to the processor 100 via the system bus 70 (step S304).

The processor 100 decrypts the Key using a secret key to decompose it into a random number and a software ID (step S306). The decryption process is performed by using the encryption/decryption unit 17.

The processor 100 then compares the random number and the software ID obtained from decryption respectively with the original random number held by the processor itself and the software ID obtained from the mounted storage media (step S308).

If the correlation fails as a result of the comparison, execution of the program by the memory managing unit 15 is rejected (step S310). On the other hand, if the correlation is completed successfully, execution of the program by the memory managing unit 15 is affirmed (step S312) and the program is executed (step S314).

The procedure of such execution permitting instruction may be implemented by describing the processing procedure of instruction as described in the above in the microcode ROM 14, for example.

Steps S302 to S312 are executed by a single instruction "Load MMU . . . ". Pseudo microprogram codes describing the instruction are given below.

```
mtspr IBATO, Rs1, Rs2
    (Set address and flag of the program in Rs1 and key
        obtained from the software supplier in Rs2,
        respectively)
ld temp_reg1, Rs2
    (Obtain key)
gen temp_reg1
    (generate a random number)
end Cokey, temp_reg2
    (Send secret key and random number to security
        device)
receive Encrypteddata, temp_reg2
    (receive encrypted ID from security device)
decrypt temp_reg3
    (compose ID's by secret key)
cmp temp_reg1, temp_reg3
    (Compare ID's each other)
jne unmatched
cmp temp_reg2, temp_reg3
    (Compare ID's each other)
jne unmatch
ld temp_reg1, Rs
    (Set address and flag of the program in Rs)
st IBATO, temp_reg1
set flag_good
end_of_instruction
unmatched;
set flag_bad
end_of_instruction
```

The authentication procedure according to such microprogram is executed totally invisibly from the external program. Because the authentication procedure of this embodiment is concluded within the processor chip, it is almost impossible to monitor from the exterior of the processor 100.

Figure 7:
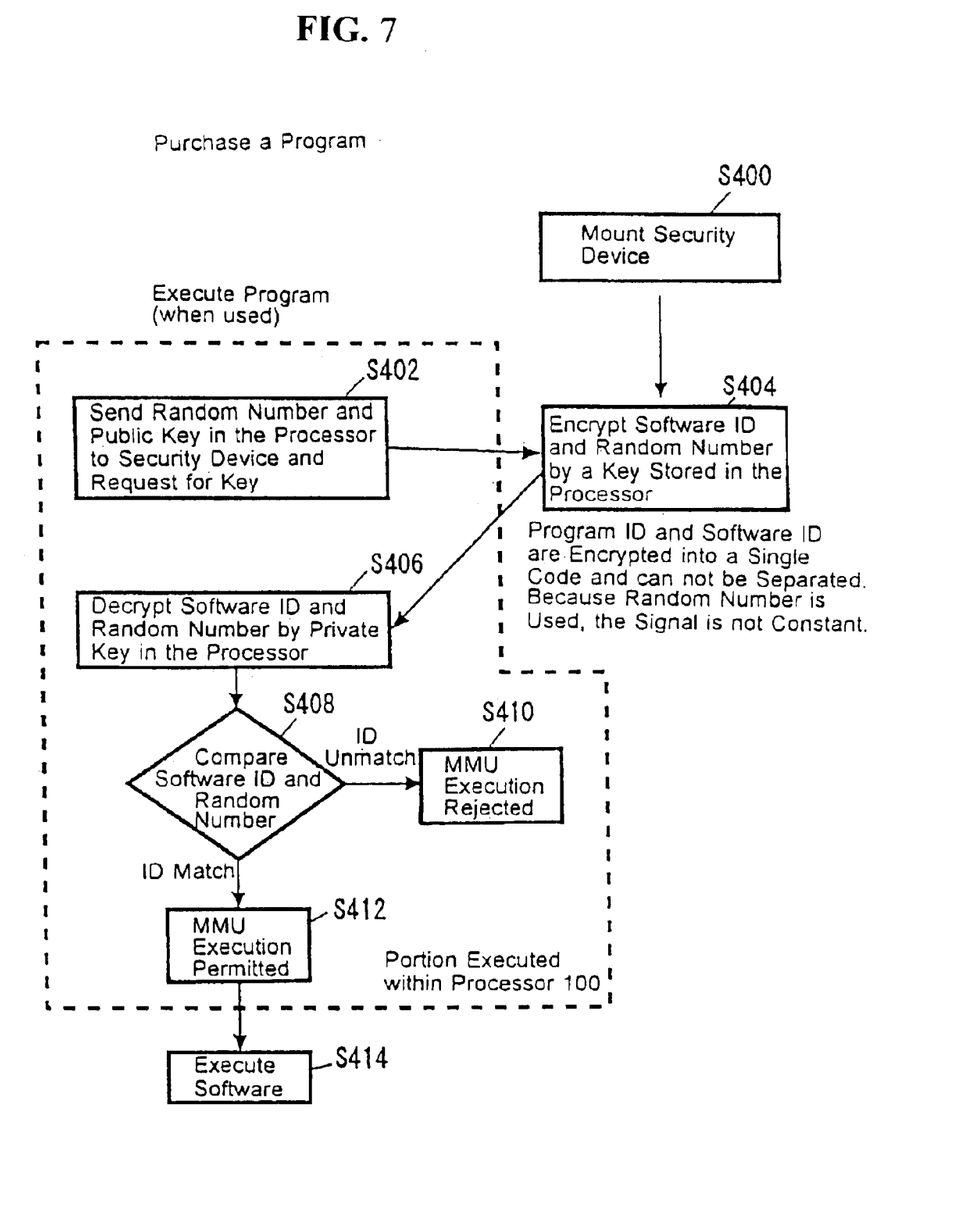
FIG. 7 is a flow chart showing a program protection operation of a fifth embodiment of this invention.

The fourth embodiment of this invention is implemented by a configuration equivalent to that shown in FIG. 5. However, a difference from the third embodiment lies in that the encryption is performed by a public key scheme rather than the secret key. FIG. 7 shows a program protection operation of the second embodiment in a flow chart. This is explained hereunder with reference to FIG. 7.

A software supplier distributes in the market a software program to be protected in the form stored in storage media such as a floppy disk or a CD-ROM. The software program is attached with unique identification information, i.e., a software ID (normally consisting of a serial number). A user acquires a limited right to use the software program in a form he or she purchases storage media such as a floppy disk or a CD-ROM from a supplier (it should be fully noted that purchasing storage media does never mean acquisition of a copyright or unlimited right to use of the software).

In this embodiment, the security device 95 is distributed along with storage media storing a software program. The user installs the software program in the hard disk 81 and, at the same time, externally connects the security device 95 to the serial port (step S400). A request for the Key is directed to the security device 95 rather than the software supplier as described later.

It is assumed that execution of the software program is prompted on the computer system 200. This is implemented by issuing an execution permitting instruction like "Load MMU . . ." by an external program such as an OS (operating system) to set the program ID and address/attribute information of the program in the memory managing unit 15.

The processing procedure corresponding to the execution permitting instruction of this embodiment is surrounded by the block of dotted line in FIG. 7. The execution permission includes a predetermined authentication procedure beside setting variables in the memory managing unit 15.

When the instruction is issued, the processor 100 requests for the Key by sending a random number generated by the random number generating unit 18 and the public key of the processor 100 to the security device 95 (step S402). The random number is sent via the system bus 70. However, because the random numbers change, in nature, from time to time and a same random number is used only once, it is very unlikely that the operation of the bus 70 is snooped and the security is broken.

The security device 95 encrypts the received random number and a software ID which the security device 95 itself stores integrally using a public key to generate the Key and sends it back to the processor 100 via the system bus 70 (step S404).

The processor 100 decrypts the Key using its own private key to decompose it into a random number and a software ID (step S406). The decryption process is performed by using the encryption/decryption unit 17.

The processor 100 then compares the random number and the software ID obtained from decryption respectively with the original random number held by the processor itself and the software ID obtained from the mounted storage media (step S408).

If the correlation fails as a result of the comparison, execution of the program by the memory managing unit 15 is rejected (step S410). On the other hand, if the correlation is completed successfully, execution of the program by the memory managing unit 15 is affirmed (step S412) and the program is executed (step S414).

The procedure of such execution permitting instruction may be implemented by describing the processing procedure of instruction as described in the above in the microcode ROM 14, for example.

Steps S402 to S412 are executed by a single instruction "Load MMU . . . ". Pseud microprogram codes describing the instruction are given below.

mtspr IBATO, Rs1, Rs2
    (Set address and flag of the program in Rs1 and key obtained from the software supplier in Rs2, respectively)
  ld_temp_reg1, Rs2
    (Obtain key)
  gen temp_reg1
    (generate a random number)
  end Pubkey, temp_reg2
    (Send public key and random number to security device)
  receive Encrypteddata, temp_reg2
    (receive encrypted ID from security device)
  decrypt temp_reg3
    (compose ID's by private key)
  cmp temp_reg1, temp_reg3
    (Compare ID's each other)
  jne unmatched
  cmp temp_reg2, temp_reg3
    (Compare ID's each other)
  jne unmatch
  ld temp_reg1, Rs
    (Set address and flag of the program in Rs)
  st IBATO, temp_reg1
  set flag_good
  end_of_instruction
unmatched;
  set flag_bad
  end_of_instruction The authentication procedure according to such microprogram is executed totally invisibly from the external program. Because the authentication procedure of this embodiment is concluded within the processor chip, it is almost impossible to monitor from the exterior of the processor 100.

As described in the above, this invention can provide an improved technology to prevent illegal use and execution of a software program used in a computer system.

This invention also provides an improved processor having a function to prevent illegal execution of a program, an instruction executed by a processor to prevent illegal execution of a program and a method of preventing illegal execution of a program.

This invention also provides an improved processor having a function to prevent illegal execution of a program which can not be externally monitored or modified, an instruction executed by a processor and a method of preventing illegal execution of a program.

This invention further provides an improved method of preventing illegal execution of a program which allows a software supplier to permit the right to use a software program only to a single processor.

While the invention has been particularly shown and described with respect to preferred embodiments thereof, it will be understood by those skilled in the art that the foregoing and other changes in form and details may be made therein without departing form the spirit and scope of the invention.

What is claimed is:

1. A processor device comprising an integrated circuit chip residing in a computer system having a function to prevent illegal execution of a program and of a type which has a memory managing unit internal to the processor device having a function to manage a main memory installed in said computer system and has an instruction set for operating itself, wherein said instruction set includes an instruction for permitting execution of a program code on said main memory, and said execution permitting instruction includes a predetermined authentication operation in addition to an operation to provide said memory managing unit with an identification number of a program to be executed and address/attribute information, wherein said authentication operation is implemented in a microprogram executed within said processor device to authenticate said program without exposure of authentication result exterior to said chip to thereby protect against system level probing and monitoring.

2. A processor of claim 1 in which said predetermined authentication operation includes comparison of the identification information stored within said processor with identification information supplied from exterior of said processor.

3. A processor of claim 2 in which said identification information comprises a processor ID unique to said processor and a software ID unique to a software program.

4. A processor of claim 2 in which said identification information comprises a random number internally generated by said processor and the software ID unique to the software program.

5. A processor of claim 1 in which the operation to provide said memory managing unit with the identification number of the program to be executed and the address/attribute information is permitted when said predetermined authentication operation is successfully completed while it is inhibited when the authentication operation fails.

6. An instruction executed by a processor device comprising an integrated circuit chip residing in a computer system of a type which has a memory managing unit internal to the processor device for managing a main memory installed in said computer system, said instruction comprising:

a predetermined authentication operation, and an operation to provide said memory managing unit with an identification number of a program to be executed and address/attribute information, wherein said authentication operation is implemented in a microprogram executed within said processor device to authenticate said program without exposure of authentication result exterior to said chip to thereby protect against system level probing and monitoring.

7. An instruction of claim 6 in which said predetermined authentication includes comparison of identification information stored within said processor with identification information supplied from the exterior of said processor.

8. An instruction of claim 7 in which said identification information used for authentication comprises a processor ID unique to said processor and a software ID unique to a software program.

9. An instruction of claim 7 in which said identification information comprises a random number internally generated by said processor and the software ID unique to the software program.

10. An instruction of claim 6 in which the operation to provide said memory managing unit with the identification number of the program to be executed and the address/attribute information is permitted when said predetermined authentication operation is successfully completed while it is inhibited when the authentication operation fails.

11. A processor device comprising an integrated circuit chip residing in a computer system having a function to prevent illegal execution of a program and of a type which executes predetermined processing while reading/writing a program code and data on a main memory, said device comprising:

a bus interface for sending/receiving an instruction and data to and from the exterior of said processor, a decoder for decoding a received instruction, an internal memory for storing a procedure relating to one or more instructions, a logic circuit implementing the procedure relating to one or more instructions, a control unit for executing instructions according to the procedure stored in said internal memory and the procedure implemented in said logic circuit, a processor ID unique to said processor, and a memory managing unit having a function to manage said main memory, one of said internal memory and said logic circuit storing a procedure of execution permitting instruction which permits execution of a program code on said main memory and the procedure of said execution permitting instruction including a predetermined authentication operation beside an operation of providing said memory managing unit with identification information of a program and address/attribute information, wherein said authentication operation is implemented in a microprogram executed within said processor device to authenticate said program without exposure of authentication result exterior to said chip to thereby protect against system level probing and monitoring.

12. A processor device of claim 11 further comprising;

an encryption means for encrypting said processor ID to output it to the exterior via said bus interface, and a decryption means for receiving encrypted identification information from the exterior of said processor device via said bus interface, the identification information including a software ID from a software supplier supplying said program, said decryption means decrypting it to derive the processor ID and the software ID, and in which said predetermined authentication operation may include comparison of each other ID's.

13. A processor of claim 11 in which;

the operation to provide said memory managing unit with the identification number of the program to be executed and the address/attribute information is permitted when said predetermined authentication operation is successfully completed while it is inhibited when the authentication operation fails.

14. A processor device comprising an integrated circuit chip residing in a computer system having a function to prevent illegal execution of a program and of a type which executes predetermined processing while reading/writing a program code and data on a main memory, said processor device comprising:

a bus interface for sending/receiving an instruction and data to and from the exterior of said processor, a decoder for decoding a received instruction, an internal memory for storing a procedure relating to one or more instructions, a logic circuit implementing the procedure relating to one or more instructions, a control unit for executing instructions according to the procedure stored in said internal memory and the procedure implemented in said logic circuit, a random number generating unit, and a memory managing unit having a function to manage said main memory, said internal memory and said logic circuit storing a procedure of execution permitting instruction which permits execution of a program code on said main memory and the procedure of said execution permitting instruction including a predetermined authentication operation beside an operation of providing said memory managing unit with identification information of s program and address/attribute information, wherein said authentication operation is implemented in a microprogram executed within said processor device to authenticate said program without exposure of authentication result exterior to said chip to thereby protect against system level probing and monitoring.

15. The processor device of claim 14 wherein said computer system comprises an encryption means for providing encrypted information, said processor device further comprising:

random number output means for outputting a random number generate by said random number generating means via said bus interface, said information to be encrypted by said encryption means including said generated random number and a software processor ID, and decoding means for receiving the encrypted identification information via said bus interface from the exterior and decrypting it to retrieve the random number and the software ID, and in which said predetermined authentication operation may include comparison of the random number with the software ID.

16. A processor of claim 14 in which;

the operation to provide said memory managing unit with the identification number of the program to be executed and the address/attribute information is permitted when said predetermined authentication operation is successfully completed while it is inhibited when the authentication operation fails.

17. A method of preventing illegal use of a program for a software supplier to permit the right to use a software program to only a single processor device comprising an integrated circuit chip residing in a computer system, said method comprising the steps of:

(a) receiving a software program to which a software ID is attached, (b) encrypting a processor ID unique to said processor device to output it to the exterior of said processor device, (c) decrypting the encrypted processor ID and encrypting a software ID managed by a software supplier together with said processor ID in the software supplier, (d) supplying the identification information encrypted in the step (c) to said processor device, (e) decrypting the identification information to retrieve the processor ID and the software ID in said processor device, (f) correlating the processor ID held by said processor device and the software ID attached to said software program with the processor ID and the software ID obtained in the step (e), respectively, (g) permitting said processor device to execute said software program only when said correlating process is completed successfully, wherein said correlating step is implemented in a microprogram executed as part of an instruction within said processor device to authenticate said software program without exposure of authentication result exterior to said chip to thereby protect against system level probing and monitoring.

18. A method of preventing illegal use of a program for a software supplier to permit the right to use a software program to only a single processor device comprising an integrated circuit chip residing in a computer system, said method comprising the steps of:

(a) receiving a software program to which a software ID is attached, (b) generating a random number by said processor device to output it to the exterior of said processor device, (c) encrypting identification information including a software ID managed by a software supplier together with said random number outputted by said processor device in the software supplier, (d) supplying the identification information encrypted in the step (c) to said processor device, (e) decrypting the identification information to retrieve the random number and the software ID in said processor device, (f) correlating the random number held by said processor and the software ID attached to said software program with the random number and the software ID obtained in the step (e), respectively, (g) permitting said processor device to execute said software program only when said correlating process is completed successfully, wherein said correlating step is implemented in a microprogram executed as part of an instruction within said processor device to authenticate said software program without exposure of authentication result exterior to said chip to thereby protect against system level probing and monitoring.

* * * * *